United States Patent
Maier

(10) Patent No.: US 7,231,283 B2
(45) Date of Patent: Jun. 12, 2007

(54) METHOD FOR REGULATING THE POWER SUPPLY OF A NUMBER OF MULTIPLE FIELD DEVICES

(75) Inventor: Stefan Maier, Rheinfelden (DE)

(73) Assignee: Endress+ Hauser GmbH+ Co. KG, Malburg (DE)

( * ) Notice: Subject to any disclaimer, the term of this patent is extended or adjusted under 35 U.S.C. 154(b) by 0 days.

(21) Appl. No.: 10/495,080

(22) PCT Filed: Nov. 8, 2002

(86) PCT No.: PCT/EP02/12471

§ 371 (c)(1),
(2), (4) Date: Oct. 29, 2004

(87) PCT Pub. No.: WO03/042800

PCT Pub. Date: May 22, 2003

(65) Prior Publication Data

US 2005/0055585 A1    Mar. 10, 2005

(30) Foreign Application Priority Data

Nov. 12, 2001   (DE) ............................. 101 51 189

(51) Int. Cl.
  *G01R 19/00*  (2006.01)
  *G06F 19/00*  (2006.01)
  *H02J 1/00*   (2006.01)
  *H02J 3/14*   (2006.01)
  *G05F 1/573*  (2006.01)
  *H01H 35/00*  (2006.01)

(52) U.S. Cl. ................ 700/291; 700/295; 700/297; 702/64; 307/34; 307/35; 307/131; 323/277; 361/93.9

(58) Field of Classification Search ................ 700/286, 700/291–293, 295, 297; 702/57, 64; 713/300, 713/320, 340; 307/31, 32, 34, 35, 131, 135; 323/274–277, 299–303; 361/5, 7, 24, 30, 361/31, 57, 63, 65, 87, 93.1, 93.9
See application file for complete search history.

(56) References Cited

U.S. PATENT DOCUMENTS 5,416,723 A    5/1995   Zyl (Continued)

FOREIGN PATENT DOCUMENTS

DE      199 04 878 A1    8/2000

(Continued)

OTHER PUBLICATIONS

International Search Report for PCT/EP02/12471 dated Mar. 31, 2003.

*Primary Examiner*—Crystal J. Barnes
(74) *Attorney, Agent, or Firm*—Bacon & Thomas, PLLC

(57) ABSTRACT

In a method for regulating the power supply of a plurality of field devices S1, S2, S3, A1, A2, connected to a data bus DBL and supplied with electrical current over the data bus DBL, the electrical current requirements of the individual field devices S1, S2, S3, A1, A2 are determined, and the electrical current consumptions of the field devices S1, S2, S3, A1, A2 are adjusted by means of corresponding control signals. In this way, the electrical current consumption of individual field devices S1, S2, S3, A1, A2 can be centrally adjusted and therewith the process conditions matched.

5 Claims, 1 Drawing Sheet

U.S. PATENT DOCUMENTS

| | | | |
|---|---|---|---|
| 5,576,700 A * | 11/1996 | Davis et al. | 340/3.31 |
| 5,752,046 A | 5/1998 | Oprescu et al. | |
| 6,041,415 A * | 3/2000 | Forster et al. | 713/300 |
| 6,167,349 A * | 12/2000 | Alvarez | 702/63 |
| 6,427,183 B1 * | 7/2002 | Seidenberg | 710/316 |
| 6,472,774 B1 * | 10/2002 | Bedouet | 307/31 |
| 6,487,509 B1 * | 11/2002 | Aisa | 702/62 |
| 6,496,103 B1 * | 12/2002 | Weiss et al. | 375/257 |
| 6,528,957 B1 * | 3/2003 | Luchaco | 315/307 |
| 6,529,847 B2 * | 3/2003 | Hamilton et al. | 702/127 |
| 6,603,218 B1 * | 8/2003 | Aisa | 307/31 |
| 6,686,831 B2 * | 2/2004 | Cook et al. | 323/273 |
| 6,748,476 B2 * | 6/2004 | Hagino | 710/305 |
| 2001/0003207 A1 | 6/2001 | Kling et al. | |
| 2002/0065631 A1 * | 5/2002 | Loechner | 702/188 |
| 2002/0162032 A1 * | 10/2002 | Gundersen et al. | 713/300 |
| 2003/0225483 A1 * | 12/2003 | Santinato et al. | 700/295 |
| 2004/0012264 A1 | 1/2004 | Burger | |
| 2004/0172205 A1 * | 9/2004 | Nitschke et al. | 702/60 |
| 2005/0165511 A1 * | 7/2005 | Fairlie | 700/286 |

FOREIGN PATENT DOCUMENTS

| | | |
|---|---|---|
| DE | 199 23 569 A1 | 11/2000 |
| DE | 100 41 521 A1 | 3/2001 |
| DE | 199 50 655 A1 | 5/2001 |
| DE | 100 15 619 A1 | 10/2001 |
| EP | 0 319 820 A1 | 6/1989 |
| EP | 913905 A2 * | 5/1999 |
| EP | JP 20000183903 | 6/2000 |
| EP | 1 032 160 A3 | 8/2000 |
| JP | 09130312 A * | 5/1997 |
| WO | WO 94/16389 | 7/1994 |
| WO | WO 01/73382 A1 | 10/2001 |

* cited by examiner

METHOD FOR REGULATING THE POWER SUPPLY OF A NUMBER OF MULTIPLE FIELD DEVICES

FIELD OF THE INVENTION

The invention relates to a method for regulating the power supply of a plurality of field devices.

BACKGROUND OF THE INVENTION

In the technologies of automation and process control, field devices are often applied for the purpose of measuring process variables (sensors) and controlling control variables (actuators).

Field devices for flow, fill level, differential pressure, temperature determination, etc., are well known. For registering the corresponding process variable, such as mass or volume flow rate, fill height, pressure, temperature, etc., the field devices are placed in the immediate vicinity of the relevant process component.

The field devices deliver a measurement signal, representing the measurement of the sampled process variable. This measurement signal is transferred to a central control unit (e.g. a control room or a process control system). As a rule, the entire process control is done from a control unit, where the measurement signals of different field devices are evaluated and, on the basis of the evaluation, control signals for actuators are produced, with the actuators then accordingly influencing the direction of the process.

An example of an actuator is a controllable valve, which regulates the flow of a liquid or gas in a section of a pipeline.

Signal transmission between field device and control unit can occur in digital form over a data bus. Known international standards for such signal transmission are PROFI-BUS, FOUNDATION FIELDBUS, and CAN-Bus. In the case of programmable field devices, it is most common to utilize ASIC's (application-specific integrated circuits) or SMD's (surface mounted devices).

Thus, in the case of programmable field devices, ever more "intelligence" is being moved into the field, to the location of actual use.

The corresponding control program of a field device is stored in the field device in non-volatile memory and is executed in a microprocessor, which controls, among other things, the operating, measuring, and control functions of the field device.

Frequently, field devices are supplied with electrical current over the data bus. Electrical current consumption of a field device depends on various factors and is, as a rule, not constant over time. When a measurement is being obtained, an increased supply of current (peak load) becomes necessary. In the times in-between, a lesser supply of current (base load) is sufficient. The electrical current consumption of each field device is set by hardware at a fixed consumption level. Normally, the consumption level corresponds to the peak load, in order to assure that the field device will always have sufficient current for all of its functions. This means that in the times between measurements, unnecessary current is being consumed.

In newer field devices, the consumption level lies between the peak load and the base load. This means, however, that these field devices must contain an energy storer, in order to cover their energy requirement during times when measurement is occurring. Once the energy storer is filled completely, the energy supplied above the base load must be wasted by useless conversion into heat.

Only a certain amount of current (limit level) can be supplied over a data bus. I.e., the number of field devices that can be connected to a data bus is limited. The sum of the consumption levels of the separate field devices must not exceed the limit level. If as many field devices as possible are to be connected to a data bus, then the consumption levels of the separate field devices must be kept as low as possible, and this means, as a consequence, a low measuring rate for the separate field devices.

If the consumption levels of the separate field devices must be lowered, because an additional field device is to be connected to the data bus, this can only be done manually, which is expensive.

SUMMARY OF THE INVENTION

An object of the invention is, therefore, to provide a method which enables a simple and requirements-matching, as well as cost effective adjustment of the consumption levels of individual field devices.

This object is accomplished by a

Method for regulating the power supply of a plurality of field devices connected to a data bus and supplied with electrical current over the data bus, wherein the electrical current consumption of each field device is adjustable, including the steps of determining the electrical current requirements of individual field devices connected to the data bus, determining, or calculating, as the case may be, the electrical current loading of the data bus, and transmitting control signals over the data bus for regulating the electrical current consumption of the individual field devices as a function of the electrical current loading of the data bus.

An essential idea of the invention is to control the electrical current supply to a plurality of field devices comprehensively over all the field devices on the basis of the electrical current loading of the data bus. In this way, the number of field devices connected to the data bus can be increased (cost savings), or the measuring rate of the field devices can be increased.

The control signals can advantageously be issued from a process control system or from one of the field devices.

In a further development of the invention, the control signals can be issued from field devices authorized serially.

The invention also includes a device for performing the method.

The invention will now be explained in greater detail on the basis of the drawings, which show as follows:

DESCRIPTION OF THE PREFERRED EMBODIMENT

Figure 1:
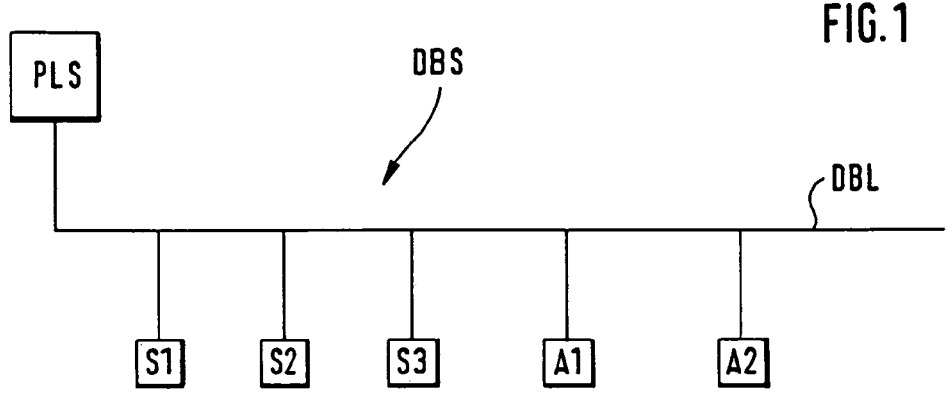
FIG. 1 schematic representation of a data bus system having a plurality of field devices.

FIG. 1 shows a data bus system DBS including a plurality of field devices and a process control system PLS. The field devices include sensors S and actuators A. The data bus participants are connected over a data bus DBL. The process control system PLS is, as a rule, arranged in a control room, from which the entire process control occurs centrally. The sensors S and actuators A are "in the field", arranged at the separate process components (tank, filling device, pipeline, etc.). Sensors S1, S2 and S3 sense e.g. the process variables temperature T, pressure P and flow rate F, in each case at a certain process component. The actuators A1 and A2 are e.g. valve controllers, which regulate the flow rate of a liquid or gas through a section of a pipeline. Data communication between the process control system PLS, the sensors S and the actuators A occurs in known manner according to an internationally standardized transmission technology (e.g. RS 485 or IEC 1158) by means of special protocols (e.g. PROFIBUS or FOUNDATION FIELDBUS, CAN-Bus).

Only a certain amount of electrical current (limit level) can be supplied over a data bus. Such depends on the application (Ex-range, not Ex-range).

Figure 2:
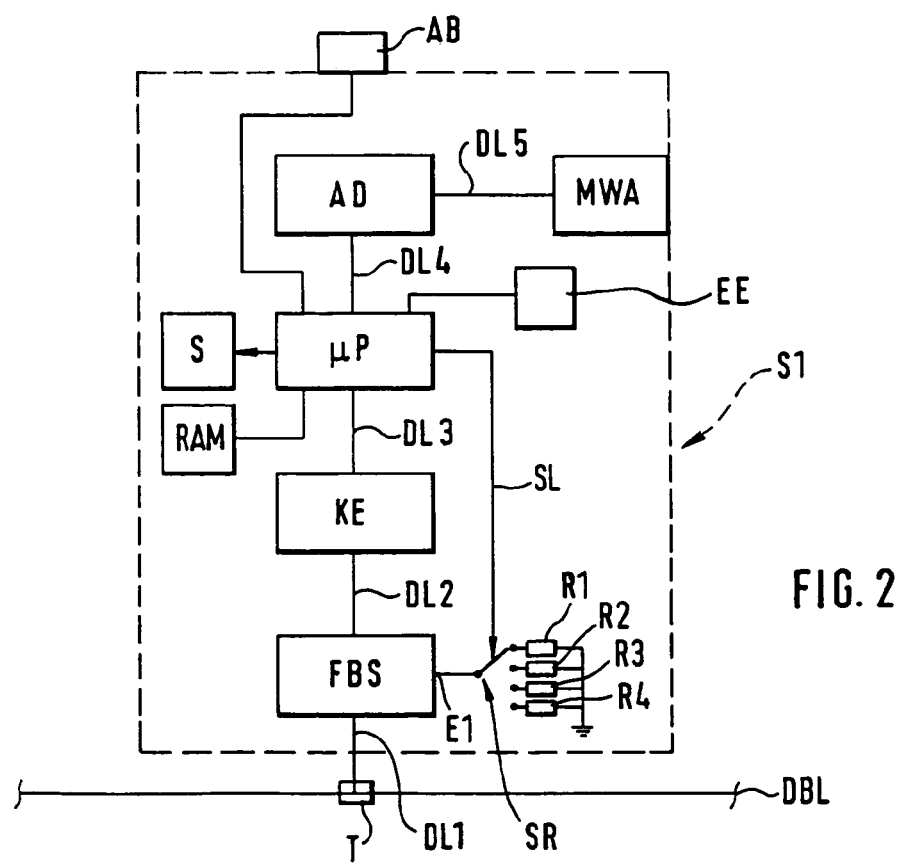
FIG. 2 schematic representation of a field device.

FIG. 2 shows more detail for the sensor S1, as an example of a field device. Sensor S1 is directly connected to the data bus DBL. Connection is accomplished by means of a T-coupler T, which is connected over a data line DL1 with a field bus interface FBS. The field bus interface FBS, which is frequently also referred to as a medium access unit (MAU), supports all transmission and receiver functions corresponding to the chosen transmission technology and cares for the electrical current supply of the sensor S1.

Data line Dl2 leads from the field bus interface FBS to a communications unit KE, which reads telegrams from the data bus or itself writes telegrams to the data bus. The communication unit KE, which is frequently provided in the form of a modem-ASIC, is connected over a data line DL3 with a microprocessor µP. The control program of the µP is stored in a non-volatile memory EE, which is an electrically erasable and re-programmable memory (Flash-Memory, or Flash-EPROM). The microprocessor µP is additionally connected with an interface, which serves for connecting to an external storage unit, e.g. a portable personal computer. Control programs and data from external memory can be transmitted through interface S to the field device. Additionally connected to the µP is a memory (RAM) and a display and operating unit AB. Furthermore, the microprocessor µP is also connected by data lines DL4 and DL5 through an AD-converter AD with a measurement transducer MWA. The A/D-converter converts the analog measurement signal to the transducer MWA into a digital measurement signal, which is processed in the microprocessor µP.

Control line SL extends from a control output of the microprocessor µP to a switch SR, which is connected with a control E1 of the field bus interface FBS and to ground through a plurality of alternatively selectable resistances R1, R2, R3, R4. Also conceivable is a continuous adjustment of the resistance.

Other possibilities for the adjustment are field effect transistors or controllable current and voltage sources.

The field bus interface FBS cares for the entire current supply of the sensor S1.

According to the invention, the electrical current supply of the sensor S1 is variable as a function of the resistance between control input E1 and the ground null point. The electrical current requirement of sensor S1 depends on whether, or not, at the moment, a measurement is being made. During the measuring phase, an increased current requirement (peak load) is experienced. During measurement pauses, a lower current supply (base load) is usually sufficient.

The method of the invention will now be explained in greater detail. In a first method step, the electrical current requirement of individual field devices connected to the data bus DEL is determined by the control unit active at the moment. The active control unit can be the process control system PLS or one of the field devices S1, S2, S3, A1 or A2. The determining of electrical current requirement can also be done alternatively by a service technician or by the control unit when the installation is turned on.

During the filling of a tank, it can be necessary to increase the measuring rate of a fill level sensor, in order to assure a safe filling. For the higher measuring rate, a higher electrical current consumption is needed.

The electrical current loadings of the field devices connected to the data bus DBL are determined, or calculated.

Additionally, a possible overloading could also be detected.

In a further method step, control signals are transmitted to the individual field devices corresponding to the electrical current loading of the data bus. These control signals regulate the electrical current consumption of the individual field devices.

In this way, the electrical current consumption of the individual field devices can be matched to the process conditions.

The control signals can be produced either by the process control system PLS, or, in an alternative embodiment, by one of the field devices.

Conceivable also is the passing of the authorization to produce control signals from one field device to the other.

The invention additionally includes a device for executing the method of the invention.

In an alternative embodiment, all field devices attached to the data bus DBL are operated in the base current mode. Only the field device, or devices, possessing an authorization (token) is/are permitted to switch into a peak load mode. Following the passing of the authorization (token), that particular field device automatically switches back into the base current mode. Thinkable also is the passing of a plurality of tokens between the field devices.

The invention claimed is:

1. A method for regulating the power supply of a plurality of field devices (S1, S2, S3, A1, A2) connected to a data bus (DBL), wherein the electrical current consumptions of the field devices (S1, S2, S3, A1, A2) are adjustable, comprising the steps of:
   a) determining the electrical current requirements of the field devices (S1, S2, S3, A1, A2) connected to the data bus (DBL);
   b) determining, or calculating, as the case may be, the electrical current loading of the data bus (DBL);
   c) issuing a control signal from a process control system (PLS);
   d) transmitting control signals over the data bus (DBL) for regulating the electrical current consumption in the form of one of: increasing or decreasing said consumption, of the individual field devices (S1, S2, S3, A1, A2) as a function of the electrical current loading of the data bus (DBL); and
   e) supplying electrical current to the field devices (S1,S2, S3,A1,A2) over the data bus (DBL) as a function of step c).

2. A method for regulating the power supply of a plurality of field devices (S1, S2, S3, A1,A2) connected to a data bus (DBL), wherein the electrical current consumptions of the field devices (S1,S2,S3,A1,A2) are adjustable, comprising the steps of:
   a) determining the electrical current requirements of the field devices (S1,S2,S3,A1,A2) connected to the data bus (DBL);
   b) determining, or calculating, as the case may be, the electrical current loading of the data bus (DBL);

c) issuing a control signal from one of the field devices (S1,S2,S3,A1,A2);

d) transmitting control signals over the data bus (DBL) for regulating the electrical current consumption in the form of one of: increasing or decreasing said consumption, of the individual field devices (S1,S2,S3,A1,A2) as a function of the electrical current loading of the data bud (DBL); and e) supplying electrical current to the field devices (S1,S2,S3,A1,A2) over the data bus (DBL) as a function of step c).

3. The method as claimed in claim 2, wherein:

an authorization for transmitting the control signals is passed from one field device (S1, S2, S3, A1, A2) to the other.

4. A device for regulating the power supply of a plurality of field devices (S1, S2, S3, A1, A2), comprising:

a process control system (PLS); and a data bus (DBL) connected to said process control system and to the plurality of field devices, wherein:

the plurality of field devices are supplied with electrical current over said data bus; and the electrical current consumption of the plurality of field devices is adjustable by control signals originating from said process control system and transmitted over said data bus (DBL), to do one of: increasing or decreasing said consumption.

5. A method for regulating the power supply of a plurality of field devices (S1, S2, S3, A1, A2) connected to a data bus (DBL), wherein the electrical current consumptions of the field devices (S1, S2, S3, A1, A2) are adjustable, comprising the steps of:

a) operating in the base current mode the field devices (S1, S2, S3, A1, A2), which lack authorization;

b) operating in the peak current mode one of the field devices (S1, S2, S3, A1, A2) having an authorization; and c) passing the authorization to another field device (S1, S2, S3, A1, A2) over the data bus (DBL), wherein:

the field devices are connected over the data bus (DBL) to a process control system (PLS), supplied with electrical current over the data bus (DBL); and the field devices (S1,S2,S3,A1,A2) are supplied with electrical current over the data bus (DBL) as a function of steps a) or b).

* * * * *